(12) United States Patent
Ditlow et al.

(10) Patent No.: US 9,733,630 B2
(45) Date of Patent: Aug. 15, 2017

(54) INTERACTIVE ENERGY DEVICE FOR ENVIRONMENTAL STEWARDSHIP

(71) Applicant: International Business Machines Corporation, Armonk, NY (US)

(72) Inventors: Gary S. Ditlow, Garrison, NY (US); Brian P. Gaucher, New Milford, CT (US); Clifford A. Pickover, Yorktown Heights, NY (US); Jinjun Xiong, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 703 days.

(21) Appl. No.: 13/971,251

(22) Filed: Aug. 20, 2013

(65) Prior Publication Data

US 2014/0277603 A1 Sep. 18, 2014

Related U.S. Application Data

(63) Continuation of application No. 13/826,419, filed on Mar. 14, 2013.

(51) Int. Cl.
G05B 15/02 (2006.01)

(52) U.S. Cl.
CPC ...... *G05B 15/02* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 5,883,802 | A | 3/1999 | Harris |
| 6,528,957 | B1 | 3/2003 | Luchaco |
| 6,785,592 | B1 | 8/2004 | Smith et al. |
| 7,181,370 | B2 | 2/2007 | Furem et al. |
| 7,406,399 | B2 | 7/2008 | Furem et al. |
| 7,444,401 | B1 | 10/2008 | Keyghobad et al. |
| 7,689,394 | B2 | 3/2010 | Furem et al. |
| 7,865,306 | B2 | 1/2011 | Mays |
| 8,024,073 | B2 | 9/2011 | Imes et al. |

(Continued)

OTHER PUBLICATIONS

Aman, S.; Simmhan, Y. and Prasanna, V.K., "Energy Management Systems: State of the Art and Emerging Trends", Jan. 4, 2013, IEEE Communications Magazine, vol. 51, Iss. 1.*

(Continued)

*Primary Examiner* — Mohammad Ali
*Assistant Examiner* — Kelvin Booker
(74) *Attorney, Agent, or Firm* — Cantor Colburn LLP; Alexa Ashworth

(57) ABSTRACT

A method, system and apparatus for operating an energy-using device are disclosed. Current data related to operation of the energy-using device is received at a remote device. An operating specification for the energy-using device is received at the remote device from a database. A recommended setting of the energy-using device is determined from the current data and the operating specification. The remote device communicates the recommended setting to the energy-using device. A control unit at the energy-using device receives the recommended setting and implements the recommended setting at the energy-using device.

15 Claims, 3 Drawing Sheets

(56) References Cited

U.S. PATENT DOCUMENTS

| | | |
|---|---|---|
| 8,536,998 B1 | 9/2013 | Siu et al. |
| 8,667,017 B1 | 3/2014 | Forney et al. |
| 2002/0072868 A1 | 6/2002 | Bartone et al. |
| 2003/0135339 A1 | 7/2003 | Gristina et al. |
| 2004/0133314 A1* | 7/2004 | Ehlers ............... G06Q 10/10 700/276 |
| 2005/0120012 A1* | 6/2005 | Poth ............... F24F 11/0086 |
| 2006/0259201 A1* | 11/2006 | Brown ............... G06Q 10/06 700/291 |
| 2007/0043478 A1* | 2/2007 | Ehlers ............... F24F 11/0012 700/276 |
| 2007/0156265 A1* | 7/2007 | McCoy ............... G05B 19/0426 700/83 |
| 2007/0162158 A1* | 7/2007 | McCoy ............... G05B 19/042 700/17 |
| 2007/0255457 A1* | 11/2007 | Whitcomb ............... G05B 15/02 700/273 |
| 2008/0040479 A1* | 2/2008 | Bridge ............... B60L 3/12 709/224 |
| 2008/0300659 A1 | 12/2008 | Matos |
| 2009/0065598 A1 | 3/2009 | Quirino et al. |
| 2009/0195349 A1 | 8/2009 | Frader-Thompson et al. |
| 2009/0240380 A1* | 9/2009 | Shah ............... G05B 15/02 700/295 |
| 2009/0307573 A1 | 12/2009 | Lavelle et al. |
| 2010/0004791 A1* | 1/2010 | West ............... G06Q 30/04 700/291 |
| 2010/0010679 A1* | 1/2010 | Kassel ............... G05D 23/193 700/278 |
| 2010/0070217 A1* | 3/2010 | Shimada ............... G01D 4/008 702/62 |
| 2010/0076612 A1 | 3/2010 | Robertson |
| 2010/0148940 A1 | 6/2010 | Gelvin et al. |
| 2010/0191487 A1* | 7/2010 | Rada ............... G05F 1/70 702/60 |
| 2010/0211443 A1* | 8/2010 | Carrel ............... G06Q 30/0208 705/14.11 |
| 2010/0217452 A1* | 8/2010 | McCord ............... G06Q 50/06 700/295 |
| 2010/0217549 A1* | 8/2010 | Galvin ............... H04B 3/54 702/62 |
| 2010/0217651 A1* | 8/2010 | Crabtree ............... G06Q 10/00 705/7.22 |
| 2010/0235008 A1* | 9/2010 | Forbes, Jr. ............... G06Q 10/00 700/291 |
| 2010/0245103 A1 | 9/2010 | Plaisted et al. |
| 2010/0262313 A1* | 10/2010 | Chambers ............... G05B 15/02 700/295 |
| 2010/0286937 A1* | 11/2010 | Hedley ............... G06Q 30/02 702/60 |
| 2011/0022242 A1 | 1/2011 | Bukhin et al. |
| 2011/0071963 A1 | 3/2011 | Piovesan et al. |
| 2011/0077758 A1 | 3/2011 | Tran et al. |
| 2011/0172837 A1* | 7/2011 | Forbes, Jr. ............... G06Q 10/00 700/291 |
| 2011/0172841 A1* | 7/2011 | Forbes, Jr. ............... G01D 4/004 700/292 |
| 2011/0231320 A1* | 9/2011 | Irving ............... G06Q 30/00 705/80 |
| 2011/0246381 A1* | 10/2011 | Fitch ............... G06Q 10/04 705/313 |
| 2011/0251807 A1* | 10/2011 | Rada ............... G01D 4/00 702/61 |
| 2011/0252248 A1 | 10/2011 | Cameron et al. |
| 2011/0264291 A1 | 10/2011 | Le Roux et al. |
| 2011/0298301 A1* | 12/2011 | Wong ............... H04L 12/2827 307/116 |
| 2012/0029718 A1* | 2/2012 | Davis ............... G05B 15/02 700/295 |
| 2012/0042356 A1* | 2/2012 | Kubota ............... G05B 15/02 726/2 |
| 2012/0053740 A1 | 3/2012 | Venkatakrishnan et al. |
| 2012/0065802 A1 | 3/2012 | Seeber et al. |
| 2012/0123594 A1* | 5/2012 | Finch ............... G05B 15/02 700/278 |
| 2012/0143356 A1* | 6/2012 | Berg-Sonne ............... G05B 15/02 700/49 |
| 2012/0179547 A1* | 7/2012 | Besore ............... G06Q 30/0261 705/14.58 |
| 2012/0253527 A1* | 10/2012 | Hietala ............... G05B 17/02 700/278 |
| 2012/0259466 A1* | 10/2012 | Ray ............... G05B 15/02 700/275 |
| 2012/0271576 A1* | 10/2012 | Kamel ............... H02J 13/0006 702/62 |
| 2012/0273581 A1* | 11/2012 | Kolk ............... F24F 11/006 236/91 D |
| 2012/0290230 A1* | 11/2012 | Berges Gonzalez ... G01D 4/004 702/61 |
| 2012/0310416 A1* | 12/2012 | Tepper ............... G05B 15/00 700/276 |
| 2013/0024029 A1 | 1/2013 | Tran et al. |
| 2013/0038218 A1* | 2/2013 | Xu ............... G05B 15/02 315/151 |
| 2013/0054758 A1 | 2/2013 | Imes et al. |
| 2013/0095864 A1 | 4/2013 | Marovets |
| 2013/0198245 A1 | 8/2013 | Kagan et al. |
| 2013/0226320 A1* | 8/2013 | Berg-Sonne ............... G05B 15/02 700/90 |
| 2013/0297084 A1* | 11/2013 | Kubota ............... H01M 10/44 700/286 |
| 2013/0325147 A1 | 12/2013 | Karnouskos |
| 2014/0149270 A1 | 5/2014 | Lombard et al. |
| 2014/0200719 A1* | 7/2014 | Fadell ............... G06Q 10/20 700/276 |
| 2014/0266669 A1* | 9/2014 | Fadell ............... G05B 19/042 340/501 |
| 2014/0316581 A1* | 10/2014 | Fadell ............... F24F 11/0009 700/276 |
| 2015/0012147 A1 | 1/2015 | Haghighat-Kashani et al. |
| 2015/0039054 A1 | 2/2015 | Matos |
| 2015/0094968 A1* | 4/2015 | Jia ............... G06Q 40/04 702/60 |
| 2015/0120015 A1* | 4/2015 | Fadell ............... G08B 19/005 700/90 |
| 2015/0156030 A1* | 6/2015 | Fadell ............... H04L 12/2816 700/90 |
| 2015/0156031 A1* | 6/2015 | Fadell ............... H04L 12/2816 700/276 |
| 2015/0293511 A1* | 10/2015 | Laufer ............... G08B 7/06 700/275 |

OTHER PUBLICATIONS

Baig, F.; Mahmood, A.; Javaid, N.; Razzaq, S.; Khan, N. and Saleem, Z., "Smart Home Energy Management System for Monitoring and Scheduling of Home Appliances Using Zigbee", 2013, Journal of Basic Applied Science Resources, vol. 3, Iss. 5.*

Han, D.-M. and Lim, J.-H., "Smart Home Energy Management System Using IEEE 802.15.4 and Zigbee", Aug. 2010, IEEE Transactions on Consumer Electronics, vol. 56, Iss. 3.*

Han, J.; Choi, C.-S.; Park, W.-K. and Lee, I., "Green Home Energy Management System Through Comparison of Energy Usage Between the Same Kinds of Home Appliances", 2011, IEEE 15th Intl. Symposium on Consumer Electronics.*

Hu, Q. and Li, F., "Hardware Design of Smart Home Energy Management System with Dynamic Price Response", Dec. 2013, IEEE Transactions on Smart Grid, vol. 4, No. 4.*

Jahn, M.; Jentsch, M.; Prause, C.R.; Pramudianto, F.; Al-Akkad, A. and Reiners, R., "The Energy Aware Smart Home", May 21-23, 2010, 5th Intl. Conference on Future Information Technology.*

Kailas, A.; Cecchi, V. and Mukherjee, A., "A Survey of Communications and Networking Technologies for Energy Management in Buildings and Home Automation", Jun. 11, 2011, Journal of Computer Networks and Communications.*

Park, S.; Kim, H.; Moon, H.; Heo, J. and Yoon, S., "Concurrent

(56) References Cited

OTHER PUBLICATIONS

Simulation Platform for Energy-Aware Smart Metering Systems", Aug. 2010, IEEE Transactions on Consumer Electronics, vol. 56, No. 3.*

Ruzzelli, A.G.; Nicolas, C.; Schoofs, A. and O'Hare, G.M.P., "Real-Time Recognition and Pofiling of Appliances Through a Single Electricity Sensor", Jun. 21-25, 2010, 7th Ann. IEEE Comm. Society Conf. on Sensor Mesh and Ad Hoc Comm. and Networks.*

Son, Y.-S.; Pulkkinen, T.; Moon, K.-D. and Kim, C., "Home Energy Management System Based on Power Line Communication", Aug. 2010, IEEE Transactions on Consumer Electronics, vol. 56, No. 3.*

Tsou, Y.-P.; Hsieh, J.W.; Lin, C.T. and Chen, C.-Y., "Building a Remote Supervisory Control Network System for Smart Home Applications", Oct. 8-11, 2006, 2006 IEEE Intl. Conf. on Systems, Man and Cybernetics.*

A. Capone, et al., "A New Architecture for Reduction of Energy Consumption of Home Appliances," European Conference of the Czech Presidency of the Council of the EU Towards eEnvironment Opportunities of SEIS and SISE: Integrating Environmental Knowledge in Europe, 2009; 8 pages.

J. Karlgren, et al., "Socially Intelligent Interfaces for Increased Energy Awareness in the Home," LNCS 4952, pp. 263-278, 2008, c. Springer-Verlag Berlin Heidelberg 2008.

J. Petersen, et al., "Dormitory Residents Reduce Electricity Consumptioin when Exposed to Real-Time Visual Feedback and Incentives," International Journal of Sustainability in Higher Education, vol. 8, No. 1, 2007, pp. 16-33.

* cited by examiner

INTERACTIVE ENERGY DEVICE FOR ENVIRONMENTAL STEWARDSHIP

CROSS REFERENCE TO RELATED APPLICATIONS

The present application is a continuation of U.S. patent application Ser. No. 13/826,419, entitled "INTERACTIVE ENERGY DEVICE FOR ENVIRONMENTAL STEWARDSHIP", filed on Mar. 14, 2013, which is incorporated herein by reference in its entirety.

BACKGROUND

The present invention relates to operating an energy-using device, and more specifically, to controlling an operation of the energy-using device using a remote device such as a hand-held device.

Energy usage and energy monitoring is becoming increasingly important. Consumers are interested in finding new ways to save energy and/or lower their energy bills. While current appliances include various energy-saving features, this is not a guarantee that the consumer may be able to maximize energy savings with the appliance. It may be entirely possible that a consumer may use the appliance in a manner that not only does not reduce energy use but which may waste energy.

SUMMARY

According to one embodiment of the present invention, a method of operating an energy-using device, includes: receiving a current data reading related to operation of the energy-using device at a remote device; receiving an operating specification for the energy-using device from a database; determining a recommended setting of the energy-using device from the current data reading and the operating specification; communicating the recommended setting from the remote device to the energy-using device; and implementing the recommended setting at the energy-using device.

According to another embodiment of the present invention, a system for operating an energy-using device includes: a control unit of the energy-using device configured to monitor current data related to operation of the energy-using device; a remote device configured to receive the current data from the control unit, obtain an operating specification for the energy-using device from a database and send a recommended setting to the control unit; and a processor configured to determine the recommended setting from the current data and the operating specification.

According to another embodiment of the present invention, an apparatus for operating an energy-using device includes a processor configured to: receive current data related to current energy usage of the energy-using device; receive an operating specification for the energy-using device; determine a recommended setting from the current data and the operating specification, and implement the recommended setting at the energy-using device to operate the energy-using device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
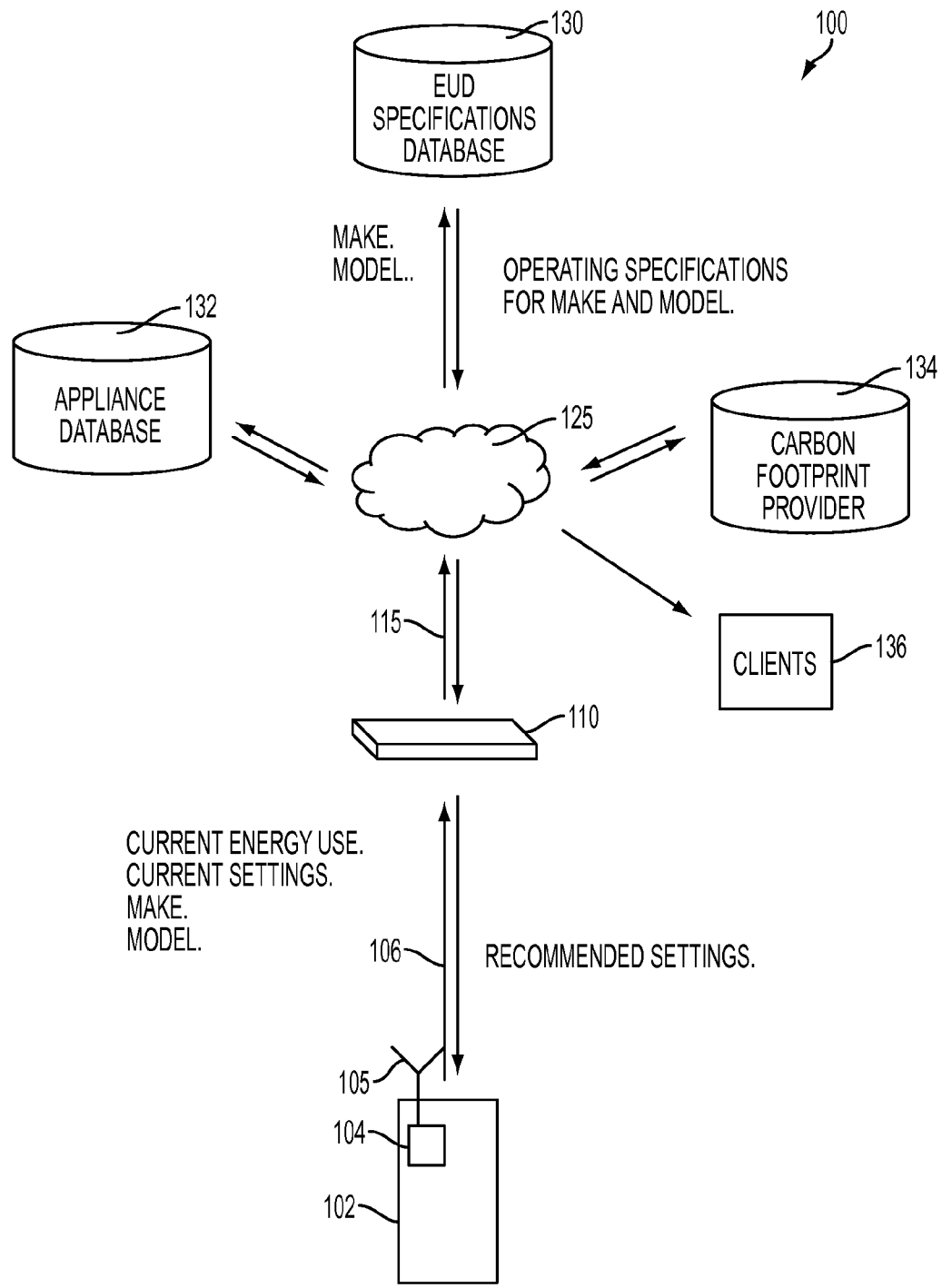
FIG. 1 shows an exemplary system for controlling an operation of an energy-using device according to an exemplary embodiment of the present invention.

FIG. 1 shows an exemplary system 100 for controlling an operation of an energy-using device 102 according to an exemplary embodiment of the present invention. The exemplary system 100 may include one or more energy-using devices, represented in FIG. 1 by exemplary energy-using device 102. In various embodiments, the exemplary energy-using device 102 may include an appliance such as a refrigerator, and air conditioning unit, a television set, an oven or stove, etc. A control unit 104 may be coupled to the energy-using device 102. In one embodiment, the control unit 104 may be integrated into the energy-using device 102 as part of a manufacturing process. Alternatively, the control unit 104 may be a separate unit that may be coupled to or retrofitted to a pre-existing energy-using device 102. The control unit 104 may monitor an energy consumption of the energy-using device 102 as well as current settings of the energy-using device 102. Such data may be referred to herein as current data or as a current data reading. For example, if the exemplary energy-using device 102 is a refrigerator, the control unit 104 may monitor an energy consumption of the refrigerator, a temperature setting of the refrigerator, a cooling cycle setting of the refrigerator, as well as other suitable settings of the refrigerator. In various embodiments, the energy consumption may be monitored over a selected time period. The energy usage data obtained during the monitoring process as well as current settings may be stored at the control unit 104. In various embodiments, the control unit 104 may further be able to control an operation or energy use of the energy-using device 102 by altering the settings of the energy-using device 102. For example, the control unit 104 may change one or more of the temperature setting of the refrigerator, the cooling cycle setting of the refrigerator, etc.

The energy-using device 102 may further include a transmitter/receiver 105 for establishing a wireless communication link for transmitting signals and data from the control unit 104 and to receive signals, data and instructions at the control unit 104. Alternately, the energy-using device 102 may include a port (not shown) for receiving a wire to thereby establish a wired communication link for such data transfer. In one embodiment, the control unit 104 may receive recommended settings of the energy-using device 102 via the communication link. Upon receiving the recommended settings, the control unit 104 may alter a setting of the energy-using device 102 to implement the recommended settings.

The exemplary system 100 further includes a remote device 110 that may communicate with the control unit 104 of the exemplary energy-using device 102. In various embodiments, the remote device 110 may be a hand-held device, such as a smartphone, a device incorporated into or integrated with a wristwatch, a device incorporated into or integrated with eyeglasses, a computer mouse or computer attachment, a personal digital assistant, an MP3 player, or other suitable device capable of established a communication link with the control unit 104 of the energy-using device 102. The remote device 110 may be a hand-held device and therefore may be transportable by a user into and out of a broadcast range or communication range of the exemplary energy-using device 102. A communication range for the energy-using device 102 may be defined. For example, the communication range may be about half a meter from the energy-using device 102. The remote device 110 and the energy-using device 102 may communication one or more secure communication protocols. In an exemplary embodiment, to establish communication (either wired or wireless) between the remote device and the energy-using device, the user moves the remote device 110 within the communication range of the energy-using device 110. In one embodiment, the energy-using device may send a periodic search signal to locate the remote device, wherein the remote device may send a signal confirming receipt of the search signal once it is within communication range. Alternatively, the remote device may initiate the communication, thereby saving energy otherwise expend on sending search signals. Once a communication link has been established, a communication program may be run at the remote device 110 that includes the use of a protocol for authentication, anonymization and/or verification. The energy-using device 102 may then send current data related to operation of the energy-using device 102 to the remote device 110, wherein the current data may include energy usage, current settings, make and model number of the energy-using device 102, etc.

The remote device 110 may have a communication link 115 to the Internet 120 or another communication channel that enables the remote device to communicate data with an energy-using device specifications (EUDS) database 130. The EUDS database 130 may be a database operated by a manufacturer of the energy-using device 102 or by a third-party. In various embodiments, the EUDS database 130 may include various operating specifications for a plurality of makes and models of the energy-using device as well as for different types of energy-using devices, i.e., refrigerator, television, heating unit. The operating specification may include an energy profile and suitable settings of the energy-using device for the energy profile. The remote device 110 may send the make and model number of the energy-using device 102 to the EUDS database 130, which may return to the remote device 110 an operating specifications related to the selected make and model number of the energy-using device 102.

The operating specifications may be compared to the current settings and energy use of the energy-using device 102 to determine a recommended setting for the energy-using device 102. This comparison and determination of the recommended setting may occur at the remote device 110 or at any suitable processor running a program for making such comparison and determination. The recommended setting may then be sent from the remote device 110 to the control unit 104, which may implement the recommended setting at the energy-using device 110. In one embodiment, the recommended setting may be sent automatically to the energy-using device 102 without any input on the part of a user. Alternately, the remote device may provide an interface by which the user may pause to review the recommended settings, make changes to the recommended settings and/or override implementation of the recommended settings.

In various embodiments, the recommended settings may be determined by taking into account user preferences. Such user preferences may include, for example, minimizing the total energy cost of the energy-using device 102, minimizing a total carbon footprint of the energy-using device 102, using the energy-using device 102 according to a user's schedule, or using the energy-using device 102 to provide a selected comfort level for the user. A selected comfort level may be applicable, for example, when the energy-using device 102 is an air-conditioning unit. Additional information, such as a location of the energy-using device, current season and/or weather patterns, and diurnal variations in energy usage, may be obtained at the remote device over a communication link such as via the Internet. The additional information may also be used when determining the recommended settings.

In another embodiment, the remote device 110 may communicate with the EUDS database 130 to detect anomalies in energy usage in order to detector fraud, appliance malfunction, or other unusual patterns of energy usage. Additionally, an analysis system may accumulate energy usage data for a variety of users, in an opt-in and/or anonymous fashion, so as to provide useful information with respect to conservation, technology, technology improvements as a function of time, seasonal variation, and region variations. Such information may be provided to any number of clients 136, where the client may be a user, policy makers, local governments, energy departments, building owners, device manufacturers, companies, service provider, etc. Additionally, this information may be correlated with likely sources of energy. For example, if it is known with 80% confidence that the energy for a particular device comes from a coal-burning plant and not hydroelectric power, this information may be stored in data fields of data records associated with such use. Such information may also be displayed to the user at the remote device 110 in the form of a report. Such information may also be used when determining the recommended setting for the energy-using device 102. The EUDS database 130 may further include historical data related to other appliances similar to the selected energy-using device 102. The historical data may be contributed via other remote devices in communication with the other appliances. Such historical information may include the eventual recommended settings provided to the other appliances.

Figure 2:
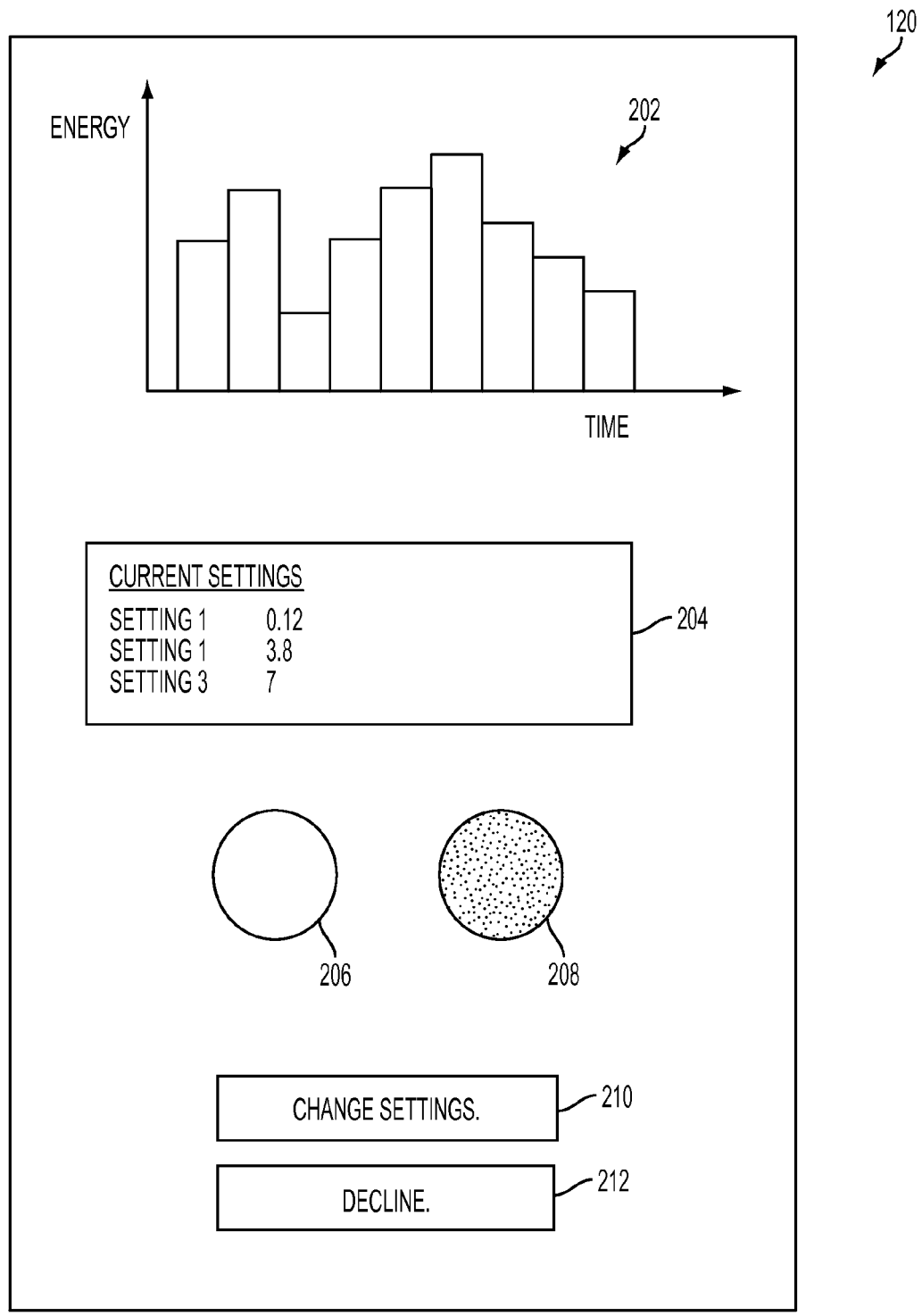
FIG. 2 shows an exemplary display that includes a number of informative features for a user that may be shown at a remote device such as a smartphone.

FIG. 2 shows an exemplary display that includes a number of informative features for a user that may be shown at a remote device 110 such as a smartphone. Alternate displays may include one or more of the features shown in FIG. 2 or may include another suitable feature. In one embodiment, the energy usage 202 such as a past energy usage over a selected time interval such as 24 hours or 1 week may be displayed. The energy usage 202 may be displayed using any suitable method, such as a histogram. Also, the remote device 110 may display the current settings 204 of the energy-using device 102. Alternately, recommended settings may be displayed. The remote device 110 may further display a color encoded to represent a summary of the energy usage performance of the energy-using device 102. In one example, a red color 206 may be displayed if the energy usage is determined to be poor and a green color 208 may be displayed if the energy usage is determined to be acceptable. The user may select a Change Settings button 210 or similar button to send recommended settings to the control unit 104 in order that the control unit 104 implements the recommended settings at the energy-using device 102. Alternately, the user may choose to decline implementing the recommended setting by selecting a Decline button 212 or similar button.

Additionally, an energy visualization feature may be displayed at the remote device 110. The energy visualization may have profiles for both real power (e.g., power from lights, stoves, hair dryers, etc.) and reactive power (e.g., appliances with motors such as refrigerators, washing machines, air conditioners, etc.) Such visualization may provide a breakdown of energy usage that enables a user to optimize energy usage.

Returning to FIG. 1, in additional embodiments, the remote device 110 may further establish a communication link to an appliance database 132 and send the current data received from the energy-using device 102 to the appliance database 132. In one embodiment, the appliance database 132 may include settings and energy specification for related energy-using devices. The appliance database 132 may send recommendations to the remote device 110 for an alternate energy-using device to replace the energy-using device 102 based on the current data related to operation of the energy-using device 102. For example, the appliance database 132 may receive current data related to a refrigerator currently in use and recommend a more energy-efficient refrigerator based on the received data. Similar to the EUDS database 130, the appliance database 132 may further include historical data for the alternate energy-using device 102.

In yet another embodiment, the remote device 110 may establish a communication link to a carbon-offset provider 134 and provide data from the energy-using device 102 to the carbon-offset provider 134. The carbon-offset provider 134 may determine a carbon footprint of the energy-using device 120 based on the data from the energy-using device 102. The carbon-offset provider 134 may provide recommended settings for the energy-using device 102 in order to alter or reduce the carbon footprint of the energy-using device 102. Alternately, the carbon-offset provider 134 may be used to determine a carbon incentive or carbon point and trade the carbon points on a carbon offset market. Similarly, the system 100 may be coupled to an automated incentive system. When the user using the remote device 110 decreases energy consumption of an energy-using device, the remote device 110 may create and/or accumulate incentives or trigger another system to accumulate the incentives. Such incentives may include points, coupons, etc.

While the system is described with respect to a single energy-using device 102 and its corresponding control unit, it is understood that the system 100 may include additional energy-using devices and may be capable of communicating with and providing recommended settings to these energy-using device using the methods disclosed herein.

Figure 3:
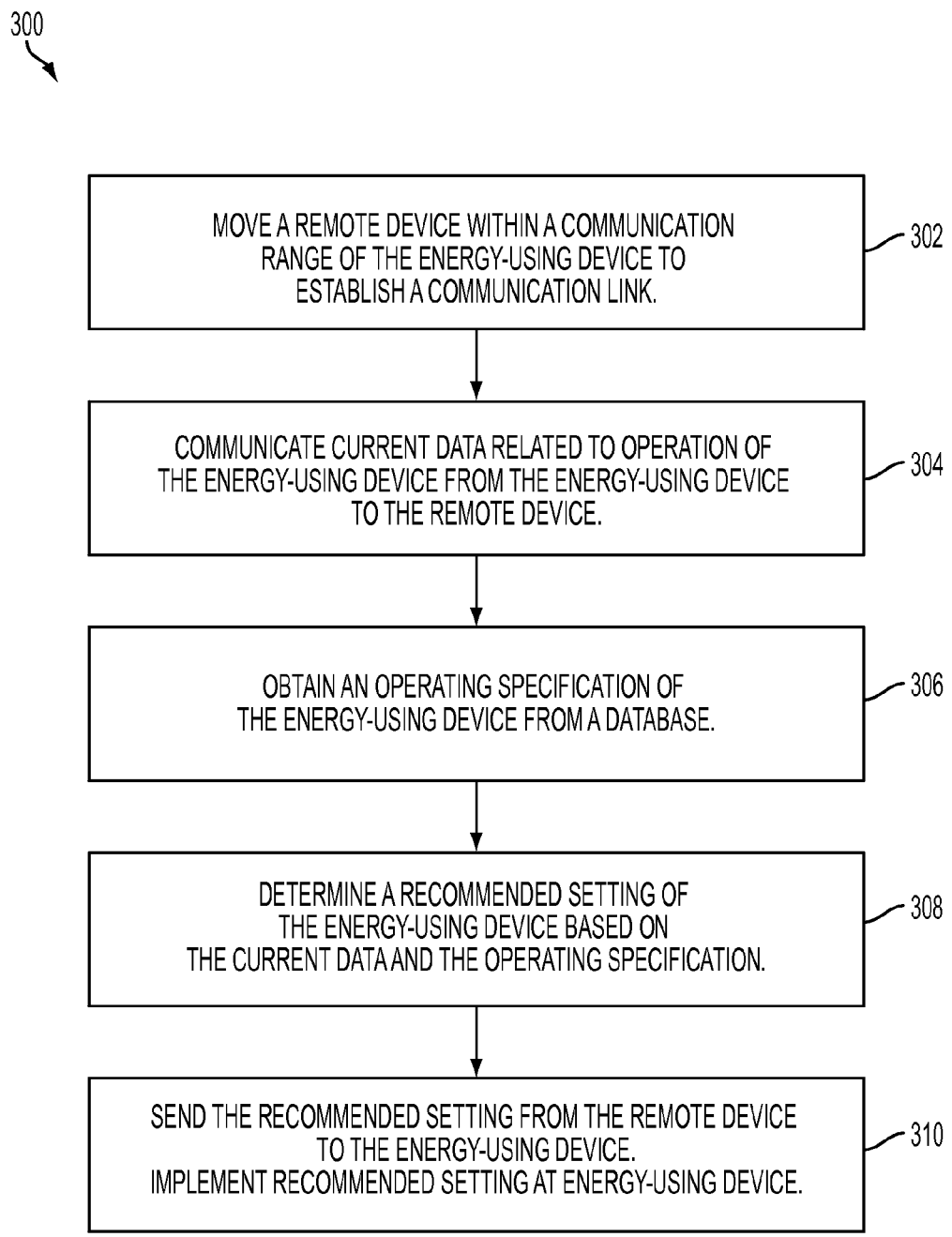
FIG. 3 shows a flowchart illustrating a method of altering a setting of an energy-using device according to an exemplary embodiment of the present invention.

FIG. 3 shows a flowchart 300 illustrating a method of altering a setting of an energy-using device 102 according to an exemplary embodiment of the present invention. In block 302, a remote device 110, such as a smartphone, capable of communicating with the energy-using device 102 is moved within a communication range of the energy-using device 102 and a communication link is established. In block 304, various data, such as energy use, current settings, make and model of the energy-using device 102 is communicated from the energy-using device 102 to the remote device 110. In block 306, an operating specification for the energy-using device 102 is obtained from a database 130 based on the make and model of the energy-using device 102. In block 308, a recommended setting of the energy-using device 102 is determined. In various embodiments, the recommended setting may be determined based on the current settings and/or current energy usage and the operating specifications. Additionally, a user preference may be taken into account when determining the recommended setting of the energy-using device 102. In block 310, the recommended setting is sent from the remote device 110 to the energy-using device 102, wherein a control unit 104 at the energy-using device changes the setting of the energy-using device 102 to the recommended settings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for operating an energy-using device, comprising:

a control unit of the energy-using device configured to monitor an energy usage over a time interval of the energy-using device and implement a recommended setting at the energy-using device; and a hand-held device transportable to within a communication range of the energy-using device, the hand-held device configured to:

establish a communication link with the energy-using device, receive the energy usage over the time interval, a current setting of the energy-using device and a make and model of the energy-using device from the control unit, send the make and model to an operations specification database for the energy-using device to obtain an energy profile for the energy-using device and a setting for the energy profile from the operations specification database, compare the energy usage over the time interval to the energy profile, provide the comparison to a display of the hand-held device, accept an input from a user at the hand-held device to select the recommended setting for the energy-usage device from the current setting of the energy-using device and the setting for the energy profile based on the comparison, and send the recommended setting to the control unit.

2. The system of claim 1, wherein the hand-held device is further configured to determine the recommended setting based on a user preference for the energy-using device.

3. The system of claim 1, wherein the hand-held device is further configured to provide an energy report for the energy-using device based on the current data.

4. The system of claim 3 wherein the energy report includes at least one of: current energy usage; energy usage over a selected time interval; a histogram of energy use over a selected time interval; a listing of current settings of the energy-using device; a listing of recommended settings of the energy-using device; and a color that represents a summary of the quality of energy usage.

5. The system of claim 3, further comprising a carbon-offset provider configured to determine a carbon footprint of the energy-using device and recommend a setting to change the carbon footprint.

6. The system of claim 3, further comprising an appliance database configured to recommend of an alternate energy-using device based on the energy report for the energy-using device.

7. The system of claim 3, wherein the remote database determines the suitable setting by accumulating energy usage from a plurality of energy-using devices have a same make and model.

8. The system of claim 1 wherein the hand-held device is one of: a smartphone, a wristwatch, eyeglasses, a computer mouse, a personal digital assistant, a television set and an MP3 player.

9. The system of claim 1, wherein the hand-held device performs one of: implementing the recommended setting automatically; and enabling a user to intervene during implementation of the recommended setting.

10. The system of claim 1, wherein the recommended setting is determined using information related to one of: a location of the energy-using device, a current season, a current weather pattern, diurnal variations in energy usage.

11. A hand-held apparatus for operating an energy-using device, comprising:
a processor configured to:
establish a communication link with the energy-using device when the hand-held device is transported to within a communication range of the energy-using device;

receive from the energy-using device an energy usage over a time interval, a current setting of the energy-using device and a make and model of the energy-using device;

send the make and model to an operations specification database for the energy-using device to receive an energy profile for the energy-using device and a setting for the energy profile from the operations specification database;

compare the energy usage over the time interval to the energy profile;

provide the comparison to a display;

accept an input from a user to select a recommended setting for the energy-usage device from the current setting of the energy-using device and the setting for the energy profile; and send the recommended setting to the energy-usage device.

12. The apparatus of claim 11, wherein the processor is further configured to perform one of: implementing the recommended settings automatically; and enabling a user to intervene during implementation of the recommended settings.

13. The apparatus of claim 11, wherein the processor is further configured to provide an energy report for the energy-using device that includes at least one of: current energy usage; energy usage over a selected time interval; a histogram of energy use over a selected time interval; a listing of current settings of the energy-using device; a listing of recommended settings of the energy-using device; a color that represents a summary of the quality of energy usage.

14. The apparatus of claim 11, wherein the processor is further configured to determine the recommended setting from the operating specification and at least one of: a user preference for the energy-using device; a location of the device, a current season, a current weather pattern, diurnal variations in energy usage.

15. The apparatus of claim 11, wherein the energy-usage device includes a control unit for monitoring the energy usage over the time interval for the energy-usage device and to implement the recommended setting received from the hand-held apparatus at the energy-using device.

* * * * *